UNITED STATES PATENT OFFICE.

ORAZIO LUGO, OF BALTIMORE, MARYLAND.

IMPROVEMENT IN THE MANUFACTURE OF FERTILIZERS FROM ANIMAL SUBSTANCES.

Specification forming part of Letters Patent No. 100,163, dated February 22, 1870.

*To all whom it may concern:*

Be it known that I, ORAZIO LUGO, of the city and county of Baltimore, State of Maryland, have invented an Improvement in the Manufacture of Animal Manure or Antiseptic Fertilizer; and I do hereby declare the following to be an exact and correct description thereof.

This invention consists in the manufacture of an antiseptic manure or fertilizer from scraps, offals, cracklings, and other similar animal matters, by means of carbolic acid or phenol, in a state of vapors or in solution with hydrocarbons, in connection with or without a current of hot air or gases, for the purpose hereafter more fully specified.

In order to enable others to apply my invention, I will describe the process.

The scraps, offals, or cracklings desired to be treated with carbolic acid are placed in a suitable vessel on floors or other devices, and a current of heated gas, previously saturated with vapors of hydrocarbons and carbolic acid or their equivalents, is introduced in said vessel, and made to come in contact with the substance placed in said apparatus. The heated hydrocarbon and phenol vapors will saturate the animal substance under treatment, so that it may be removed from said vessel after several hours' treatment and dried, if found to be necessary.

The above-mentioned animal matters may also be treated with carbolic acid or its equivalents, in solution with suitable hydrocarbons, at any desired temperature, when the same result will be obtained—*i. e.*, a manure or fertilizer containing carbolic acid, and capable of being kept any length of time without much danger of putrid fermentation.

After treatment with the solution above mentioned, the material should be pressed, so as to extract the oil. The residuum may then be pulverized or ground, and used either alone or mixed with other materials, to form fertilizers.

Such manure will also be found beneficial in destroying insects or animalculæ in the soil where it is applied.

What I claim as my invention, and desire to secure by Letters Patent of the United States, is—

1. The use of phenol (carbolic acid) and hydrocarbons, or their equivalents, in connection with or without heated gas or vapors, for the purpose and in the manner substantially as set forth.

2. As a new article of manufacture, the antiseptic manure or fertilizer from animal matter, by the process for the manufacture of which is herein set forth.

ORAZIO LUGO.

Witnesses:
EDM. F. BROWN,
A. MOORE.